United States Patent
August et al.

(10) Patent No.: US 8,514,141 B2
(45) Date of Patent: Aug. 20, 2013

(54) LOW-FREQUENCY TAG WITH SEPARATE TRANSMIT AND RECEIVE ANTENNAS

(75) Inventors: M. Jason August, Toronto (CA); John K. Stevens, Stratham, NH (US); Paul Waterhouse, Selkirk (CA)

(73) Assignee: Visible Assets, Inc., Mississauga, Ontario (CA)

( * ) Notice: Subject to any disclaimer, the term of this patent is extended or adjusted under 35 U.S.C. 154(b) by 662 days.

(21) Appl. No.: 12/759,542

(22) Filed: Apr. 13, 2010

(65) Prior Publication Data

US 2010/0259459 A1 Oct. 14, 2010

Related U.S. Application Data

(60) Provisional application No. 61/168,871, filed on Apr. 13, 2009.

(51) Int. Cl.
*H01Q 1/00* (2006.01)

(52) U.S. Cl.
USPC .................. 343/787; 343/788; 340/572.7

(58) Field of Classification Search
USPC ................. 343/787, 788; 340/572.7
See application file for complete search history.

(56) References Cited

U.S. PATENT DOCUMENTS

| | | | |
|---|---|---|---|
| 5,317,330 A * | 5/1994 | Everett et al. | 343/867 |
| 6,021,951 A | 2/2000 | Nishikawa | |
| 6,356,535 B1 | 3/2002 | Smith | |
| 2004/0149822 A1 * | 8/2004 | Stevens et al. | 235/385 |
| 2004/0178912 A1 | 9/2004 | Smith et al. | |
| 2005/0156039 A1 | 7/2005 | Carrender et al. | |
| 2005/0258966 A1 | 11/2005 | Quan | |
| 2006/0092079 A1 * | 5/2006 | de Rochemont | 343/700 MS |
| 2006/0109130 A1 * | 5/2006 | Hattick et al. | 340/572.7 |
| 2006/0192007 A1 | 8/2006 | Ide | |
| 2006/0250251 A1 | 11/2006 | Stewart | |
| 2008/0001716 A1 | 1/2008 | Stevens et al. | |
| 2012/0127047 A1 * | 5/2012 | Gertenbach et al. | 343/745 |

FOREIGN PATENT DOCUMENTS

WO 2009092124 A1 7/2009

* cited by examiner

*Primary Examiner* — Tho G Phan
(74) *Attorney, Agent, or Firm* — Larson & Anderson, LLC

(57) ABSTRACT

A low frequency inductive two-way radio transceiver tag is provided that has separate antennas for transmitting and receiving signals within a reading volume. Thus, the tag of the invention includes both a transmit antenna and a receiving antenna, either separately or as a single antenna tuneable between two functional states with different impedances. The impedance of the receiving antenna is greater than the impedance of the transmitting antenna. For example, the impedance of the receiving antenna may be greater than the impedance of the transmitting antenna by a factor of $10^3$.

10 Claims, 2 Drawing Sheets

LOW-FREQUENCY TAG WITH SEPARATE TRANSMIT AND RECEIVE ANTENNAS

STATEMENT OF RELATED APPLICATIONS

This application claims the benefit of U.S. Provisional Application No. 61/168,871 filed Apr. 13, 2009, which application is incorporated herein by reference for all purposes.

BACKGROUND OF THE INVENTION

Radio frequency identification (RFID) tags are in daily use for many applications. Depending on the application, tags may by active (i.e. with an on-board power supply such as a battery) or passive (external power source, commonly through an RF signal). Tags may also be intended to be read one-at-a-time, only when placed in close proximity to a reader device, or may be intended for use in an environment in which many tags are potentially in range of a reader at the same time. Tags may operate at high frequencies, or low frequencies, and selection of frequency depend on the application and the operating environment.

Also known are RuBee tags, which are defined by IEEE standard 1901.1. RuBee IEEE 1901.1 (IEEE 1902.1) is a two-way, active wireless protocol that uses Long Wave (LW) magnetic signals to send and receive short (128 BITS) data packets in a local regional network. The protocol is similar to the IEEE 802 protocols which are also known as WiFi (IEEE 802.11), WPAN (IEEE 802.15.4) and Bluetooth (IEEE 802.15.1), in that RuBee is networked by using on-demand, peer-to-peer, active radiating transceivers. RuBee is different in that it uses a low frequency (131 kHz) carrier.

RuBee is also different from conventional RFID Radio Frequency Identification. It does not work like passive or active RFID, which all use back-scattered transmission mode, in which the RFID tags act like a mirror, and work as reflective transponders. In contrast, RuBee is a is a networked transceiver that actually transmits a data signal on demand RuBee tags commonly have 131 kHz as an operating frequency provides, although other low frequencies less than about 450 kHZ can be employed. RuBee with the advantages of ultra low power consumption (battery life measured in years), and normal operation near steel and/or water. These features make it easy to deploy sensors, controls, or even actuators and indicators.

Because RuBee uses long wavelengths and works in the near field (under 100 feet) it is possible to simultaneously transmit and receive from many adjacent antennas, without interference providing the signals are synchronized. That makes it possible to enhance bandwidth and remove any angle sensitivity normally seen with other RF systems.

SUMMARY OF THE INVENTION

In accordance with the present invention, a low frequency inductive two-way radio transceiver tag is provided that has two modes of operation corresponding to the Transmit or Receive functions. In one embodiment, two separate antennas for transmitting and receiving signals within a reading volume are used. Thus, the tag of the invention comprises a transmit antenna, and a separate receiving antenna. The impedance of the receiving antenna is greater than the impedance of the transmitting antenna. For example, the impedance of the receiving antenna may be greater than the impedance of the transmitting antenna by a factor of $10^3$.

Alternatively, a single antenna may be used for the transmit and receive modes. In Transmit mode the coil is connected in series resonance. In Receive mode, the antenna's coil is driven in parallel resonance mode. Again, the impedance of the antenna in receive mode is greater than the impedance of the antenna in transmit mode. For example, the impedance of the antenna in receive mode can be greater than the impedance of the transmit mode by a factor of $10^3$.

DETAILED DESCRIPTION OF THE INVENTION

Figure 1:
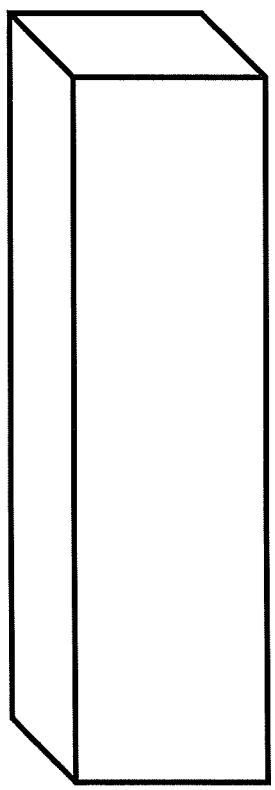
FIG. 1 shows an exterior view of a tag in accordance with the invention.

FIG. 1 shows an exterior view of a tag in accordance with the invention. The tag may be a plain case as shown, or it may have external features such as displays or status indicator lights as known in the art. The overall shape of the tag is not critical.

The present invention provides an improvement to a tag, such as a RuBee tag, which is a low frequency inductive two-way radio transceiver tag. As used in the present application and claims, the term "two-way" refers to a tag what includes a transceiver that transmits a data signal on demand, as opposed to merely acting as a transponder to reflect an input signal.

As used in the present application and claims, the term "low frequency" refers to the frequency at which the tag transmits and receives. The transmit and receive frequencies can be the same or different provided that each is below 1 MHz, for example about 131 kHz. The transmit and receive frequencies can be tuned for optimum performance of a tag, as described in US-2008-0001716, which is incorporated herein by reference.

The tag of the present invention differs from known tags low frequency inductive two-way radio transceiver tag, including known RuBee tags, in the inclusion of separate antennas for receiving and transmitting. This makes is possible to have a low impedance, high Q transmitting antenna with maximum power transfer, and a high impedance, high Q receiving antenna that maximizes sensitivity for receiving. In preferred embodiments, both the transmit antenna and the receiving antenna are ferrite antennas.

As used in the specification and claims of this application, the term "separate antennas" refers either to two separate structures one for each of the transmit and receive function which have the desired difference in impedance, or to one antenna structure which is tuneable between an impedance for transmitting and an impedance for receiving.

Figure 2:
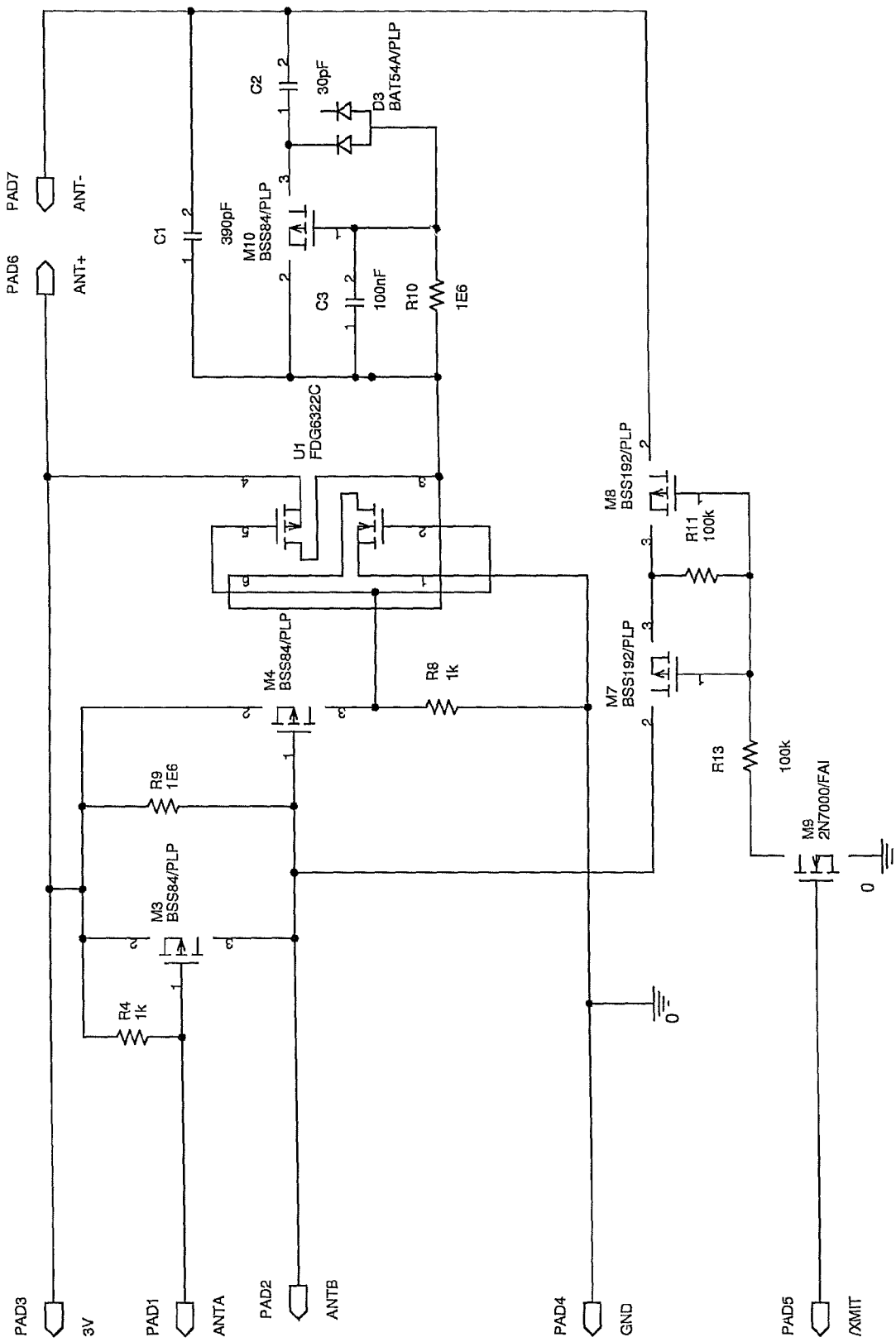
FIG. 2 shows a circuit diagram of an single antenna circuit connected in 2 selectable modes according to the present invention.

FIG. 2 shows a multi-mode antenna output circuit that can be used to provide the separate send and receive antenna mode via one antenna circuit. The circuit has seven contact pads, identified as PAD1-PAD7. PAD1 is Antenna A, and is the input/output connect to a suitable modem IC, such as a RuBee modem made by Visible Assets, Inc. PAD2 is Antenna B and is connect to the Antenna B input/output on a suitable RF modem, such as the RuBee modem IC. PAD3 is the positive 3V power supply. PAD4 is ground 0V power supply. PAD5 is the transmit control to control transmit or receive function in the present circuit. PAD6 (Ant+) is the new transmit antenna function that connects to one conductor on the antenna coil. PAD7 (Ant−) connects to other connect on the antenna coil.

Typically a standard antenna used in a traditional design (single mode only) has an impedance of 3000 Ohm. According to the present invention, as shown in FIG. 2, the Transmit impedance is 100 Ohm and Receive is 100,000 Ohms. Therefore, the transmit power is increased by a factor of 30 over the traditional antenna. Similarly, the receive power is increased by a factor of 30 as well.

In the present circuit, M3 and M4 are used to regenerate a square wave in transmit mode to drive U1 which a low resistance driver to drive the antenna coil. C1 and C2 tune the antenna resonance in transmit mode to a frequency of 131 kHz. In receive mode, M9, M7 and M8 form a switch to connect the antenna to AntB input on the modem IC. Also, in receive mode, M10 is turned off so only capacitor C1 tunes the antenna in receive mode. M10 is on in Transmit mode, because D3 rectifies some of the transmit voltage to turn on M10, thereby compensating for input capacitance of the chip by using C1 and C2.

To confirm the operability of a tag that includes separate transmit and receive antennas, an antenna circuit as shown in FIG. 2 was incorporated into a two-way low frequency inductive two-way radio transceiver tag operating at a frequency of 132 kHz. The antenna used was 5 mm diameter ferrite of 12 cm length having 100 turns 26 gauge copper wire. This tag was placed on the top of a movable plastic cart in a 25'×30' room and the ability to communicate with different types of reader antennas was tested. Signals were collected using a PSS 409 REV BLASTER (Visible Assets, Inc). Linear distances were measured using a DIMETRIX Long Range Laser Displacement Sensor (DLS-B30) and FINDER software, version 9.15.

In the first experiment, a Visible Assets RANGER antenna was used for the reader. This antenna is a rectangular coil (12"×17") which was placed on a table standing on one edge such that the plane of the antenna was perpendicular to a line between the antenna and the tag. Successful reads of the tag were achieved consistently at distances up to about 30 feet, although the greatest signal amplitude was achieved at distances less than 7.5 feet. The maximum read distance in this configuration was 34.85 ft.

In a second experiment, a RUBEE rod antenna was disposed on a table with the length of the rod extending along line to the tag placed on the plastic cart. Successful reads of the tag were achieved consistently at distances up to about 29 feet, although the greatest signal amplitude was achieved at distances less than 7.5 feet. The maximum read distance in this configuration was 29.1 ft.

The orthogonal distance using both the RUBEE rod antenna and the RANGER antenna was 12 feet.

In a third experiment, an RPM antenna was disposed in the center of the room, 8 feet off the floor and the cart with the tag was placed adjacent to it. The antenna used here is of 2 ferries of 3 cm diameter and 30 cm long, both oriented at 90 degrees orthogonally to each other to reduce inductive coupling. The tag was oriented so that a larger surface of the tag was coplanar with the antenna, and was located 4 feet below the antenna. Successful reads of the tag were achieved consistently at distances up to about 15 feet on either side of the antenna location, although the greatest signal amplitude was achieved at distances less than about 4.5 feet. The signal strength has a fairly narrow peak and two wings of lesser strength.

In a fourth experiment, an RPM antenna was disposed on the ceiling in the center of the room, and the cart with the tag was placed beneath it. The tag was oriented so that one of the narrow surfaces of the tag was coplanar with the antenna. Successful reads of the tag were achieved consistently at distances up to about 15 feet on either side of the antenna location, although the greatest signal amplitude was achieved at distances less than 7.5 feet with signal strength dropping off in a substantially normal distribution.

In a fifth experiment, an RPM antenna was disposed on the ceiling in the center of the room, and the cart with the tag was placed beneath it. The tag was oriented vertically so that the end was pointed upwards. Successful reads of the tag were achieved consistently at distances up to about 15 feet on either side of the antenna location, although the greatest signal amplitude was achieved at distances less than 7.5 feet with signal strength having a central plateau region before dropping off in a substantially normal distribution.

The third, fourth and fifth experiments were repeated, except that the tag was placed on the bottom shelf of the cart, rather than on the top shelf such that the vertical distance from the antenna was 8 feet. In this location, the consistent reads were still observed to about fifteen feet from the antenna.

The third, fourth and fifth experiments were repeated, except that the tag was placed on the bottom shelf of the cart, rather than on the top shelf and the RPM antenna was raised 2 feet such that the vertical distance of the tag from the antenna was 10 feet. In this configuration, consistent reads were still observed to about fifteen feet from the antenna on either side.

Thus, using the RPM antenna, the tag was successfully read with a measurable linear range of 33.63 feet, regardless of the vertical distance between the tag and the antenna, and regardless of the orientation of the tag. This was the maximum read distance for the laser as limited by the physical size of the room. Thus, the tag of the invention may be read anywhere within the volume of the 25'×30' room placed at 8 to 10 feet above the floor. Tag range in other tests without the laser range system showed the range to be closer to 40' with high accuracy. Dropping accepted correlation of good ID bits to incorrect bits to 50% results in a range of 70 feet (in a high noise environment). This is substantially better than the same tag with a single antenna, where the range is about 12-15 feet.

Similar improvements in range are achieved using smaller sized antennas incorporated into smaller size tags (such as Visible Assets T-Tag or 2T-Tags), to permit full room coverage with only one or, for a large room, a very limited number of reader antennas like the ROM antenna.

The invention further provides a system comprising an antenna, such as an RPM antenna effective to transmit signals to and receive signals from a low frequency inductive two-way radio transceiver tag, and one or more tags in accordance with the invention. This system may be disposed in a room, with the antenna(s) disposed either at or near the floor or ceiling of the room. Where a single antenna is used, it is placed near the geometric center of the room. If more than one antenna is used, they are suitably placed at location equally spaced from one another and the borders of the room.

The invention claimed is:

1. A two-way low frequency inductive two-way radio transceiver tag, wherein the tag comprises a transmit antenna and a separate receiving antenna, and wherein the impedance of the receiving antenna is greater than the impedance of the transmitting antenna by a factor of $10^3$.

2. The transceiver tag of claim 1, wherein the transmit and receiving antennas are ferrite antennas.

3. The transceiver tag of claim 1, wherein the transmit and receiving antennas are ferrite antennas.

4. The transceiver tag of claim 1, wherein a single antenna structure is used for both the transmit and receive antennas, and the impedance of the antenna structure is tuned in accordance with the function.

5. A system comprising:
(a) a read antenna effective to transmit signals to and receive signals from a low frequency inductive two-way radio transceiver tag, and
(b) one or more two-way low frequency inductive two-way radio transceiver tag, wherein the tag comprises a transmit antenna, and a separate receiving antenna, and wherein the impedance of the receiving antenna is greater than the impedance of the transmitting antenna by a factor of $10^3$.

6. The system of claim 5, wherein the transmit and receiving antennas are ferrite antennas.

7. The system of claim 5, comprising a single read antenna, wherein the read antenna is in a room at the floor or ceiling of the room, and wherein the tags can be read at any location within the volume of the room.

8. The system of claim 5, wherein a single antenna structure is used for both the both the transmit and receive antennas of the tag, and the impedance of the antenna structure is tuned in accordance with the function.

9. The system of claim 8, wherein the transmit and receiving antennas are ferrite antennas.

10. The system of claim 8, comprising a single read antenna, wherein the read antenna is in a room at the floor or ceiling of the room, and wherein the tags can be read at any location within the volume of the room.

\* \* \* \* \*